(12) United States Patent
Low et al.

(10) Patent No.: US 8,132,106 B2
(45) Date of Patent: *Mar. 6, 2012

(54) PROVIDING A DOCUMENT PREVIEW

(75) Inventors: Aidan N. Low, Redmond, WA (US); Paul A. Gusmorino, Redmond, WA (US); Scott Hysom, Redmond, WA (US); Jon Rosenberg, Redmond, WA (US); Mike Sheldon, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 371 days.

This patent is subject to a terminal disclaimer.

(21) Appl. No.: 11/473,435

(22) Filed: Jun. 23, 2006

(65) Prior Publication Data

US 2007/0297029 A1   Dec. 27, 2007

(51) Int. Cl.
*G06F 3/00* (2006.01)
(52) U.S. Cl. .......................... 715/740; 358/527
(58) Field of Classification Search .............. 715/740; 358/527

See application file for complete search history.

(56) References Cited

U.S. PATENT DOCUMENTS

| | | | |
|---|---|---|---|
| 5,307,086 A | 4/1994 | Griffen et al. |
| 5,579,466 A | 11/1996 | Habib et al. |
| 5,640,580 A | 6/1997 | Slayden et al. |
| 5,652,901 A | 7/1997 | Slayden et al. |
| 5,680,629 A | 10/1997 | Slayden et al. |
| 5,694,610 A | 12/1997 | Habib et al. |
| 5,818,447 A | 10/1998 | Wolf et al. |
| 5,835,084 A | 11/1998 | Bailey et al. |
| 5,838,320 A | 11/1998 | Matthews, III et al. |
| 5,845,293 A | 12/1998 | Veghte et al. |
| 5,903,905 A | 5/1999 | Andersen et al. |
| 6,008,806 A | 12/1999 | Nakajima et al. |
| 6,034,687 A | 3/2000 | Taylor et al. |
| 6,098,090 A | 8/2000 | Burns |
| 6,134,566 A | 10/2000 | Berman et al. |
| 6,160,554 A | 12/2000 | Krause |
| 6,405,225 B1 | 6/2002 | Apfel et al. |
| 6,616,702 B1 | 9/2003 | Tonkin |
| 6,734,883 B1 | 5/2004 | Wynn et al. |
| 6,839,411 B1 | 1/2005 | Saltanov et al. |
| 6,944,819 B2 | 9/2005 | Banatwala et al. |
| 7,017,073 B2 | 3/2006 | Nair et al. |
| 7,113,934 B2 | 9/2006 | Levesque et al. |

(Continued)

FOREIGN PATENT DOCUMENTS

DE   19800423   7/1998

(Continued)

OTHER PUBLICATIONS

Hubona, et al., "Enhancing Data Discovery Using the ArcSDE Java API", http://gis.esri.com/library/userconf/proc04/docs/pap1840.pdf.

(Continued)

*Primary Examiner* — Tadeese Hailu
*Assistant Examiner* — Darrin Hope (57) ABSTRACT

A system, apparatus, method, and computer-readable media are provided for generating a document preview. According to one method, a preview handler is provided that exposes interfaces that may be called by a host application to generate a document preview without launching the application program that created the document. The interfaces exposed by the preview handler provide a common framework that may be utilized by both operating system and application program hosts to provide document previews.

20 Claims, 5 Drawing Sheets

U.S. PATENT DOCUMENTS

| | | | |
|---|---|---|---|
| 7,243,298 | B2 | 7/2007 | Yozell-Epstein et al. |
| 7,353,232 | B1 | 4/2008 | Kalucha et al. |
| 7,647,559 | B2 | 1/2010 | Yozell-Epstein et al. |
| 2003/0076322 | A1 | 4/2003 | Ouzts et al. |
| 2003/0101383 | A1 | 5/2003 | Carlson |
| 2004/0054737 | A1 | 3/2004 | Daniell |
| 2004/0068545 | A1 | 4/2004 | Daniell et al. |
| 2004/0158607 | A1 | 8/2004 | Coppinger et al. |
| 2004/0189695 | A1 | 9/2004 | Kurtz et al. |
| 2004/0193599 | A1 | 9/2004 | Liu et al. |
| 2004/0205625 | A1* | 10/2004 | Banatwala et al. ........... 715/526 |
| 2004/0205633 | A1 | 10/2004 | Martinez et al. |
| 2004/0260756 | A1 | 12/2004 | Forstall et al. |
| 2005/0010860 | A1 | 1/2005 | Weiss et al. |
| 2005/0117032 | A1 | 6/2005 | Ueda et al. |
| 2005/0192974 | A1 | 9/2005 | DeLorme et al. |
| 2005/0235203 | A1* | 10/2005 | Undasan ....................... 715/526 |
| 2005/0246643 | A1* | 11/2005 | Gusmorino et al. .......... 715/734 |
| 2006/0031336 | A1 | 2/2006 | Friedman et al. |
| 2006/0031775 | A1 | 2/2006 | Sattler et al. |
| 2006/0036568 | A1 | 2/2006 | Moore et al. |
| 2006/0074869 | A1 | 4/2006 | Rosenberg et al. |
| 2006/0075046 | A1 | 4/2006 | Yozell-Epstein et al. |
| 2006/0156240 | A1* | 7/2006 | Lemay et al. ................. 715/730 |
| 2006/0224937 | A1 | 10/2006 | Sudoh et al. |
| 2010/0095224 | A1 | 4/2010 | Yozell-Epstein et al. |

FOREIGN PATENT DOCUMENTS

| | | |
|---|---|---|
| EP | 1182600 | 2/2002 |
| GB | 2347581 | 9/2000 |
| JP | 10-247156 | 9/1998 |
| JP | 10-320390 | 12/1998 |
| JP | 2002-278899 | 9/2002 |
| JP | 2003330355 | 11/2003 |
| JP | 2004199700 | 7/2004 |
| KR | 10-2001-0048628 | 6/2001 |
| KR | 10-2002-0096509 | 12/2002 |
| ZA | 200306968 | 6/2004 |

OTHER PUBLICATIONS

Owen Taylor, "A new file selector for GTK+", http://people.redhat.com/otaylor/fosdem2003/file-selector.html#introduction.

Sonnino, et al., "FileSnoop 2: Safe & Efficient Windows Exploring 04.20.04", http://www.pcmag.com/article2/0,1895,1571719,00.asp?kc=PCGL10310KTX2B2200331.

Office Action from the Japan Patent Office regarding Japanese Patent Application No. 2005-0183574 dated Aug. 12, 2011.

Office Action from the Korean Patent Office regarding Korean Patent Application No. 10-2005-0057765 dated Aug. 24, 2011.

Olsen, J.W., "Best Outlook Add-Ins and Helpers", Sep. 14, 2004 www.windowsdevcenter.com/pub/a/windows/2004/09/14/Outlook_Addins.html.

PR Newswire, "X1 Brings Instantaneous Search to Email, Attachments and PC Files", Feb. 18, 2004.

European Communication dated Mar. 28, 2006, European Search Report for Application No. EP05107772.5.

European Communication dated Mar. 29, 2006, European Search Report for Application No. EP05105464.1.

U.S. Office Action dated Nov. 16, 2006 U.S. Appl. No. 10/955,361.

Barber et al., "Entourage Email and Newsgroups", Office X for Macintosh: The Missing Manual, O'Reilly Publishing, Jul. 2002, 68 pages.

U.S. Office Action dated Dec. 19, 2006 U.S. Appl. No. 10/954,328.

U.S. Final Office Action dated Jun. 11, 2007 U.S. Appl. No. 10/954,328.

U.S. Office Action dated Nov. 1, 2007 U.S. Appl. No. 10/954,328.

European Communication dated Aug. 23, 2007, European Search Report for Application No. EP05105348.6-1243.

Anonymous: "Newest Release of Verity Key View Viewing Software Development Kits Now Available", Verity Press Release, Sep. 27, 2004, XP-002447751, http://www.autonomy.com/content/News/Releases/2004/V0927.en.html.

Anonymous: "Verity KeyView Viewing SDK Guide—Version 8.0", Verity KeyView Documentation, No. DE0156, dated May 28, 2004, XP007902819.

Anonymous: "Netscape Gecko Plug-ins—API Reference—Version 2.0", Netscape Documentation, Aug. 2002, XP007902820, http://devedge-temp.mozilla.org/library/manuals/2002/plugin/1.0/plugin.pdf.

Correspondence from the Japanese Patent Office regarding Japanese Patent Application No. 2005-183578 dated Mar. 7, 2008.

Correspondence from the Japanese Patent Office regarding Japanese Patent Application No. 2005-183578 dated Dec. 9, 2008.

Koyama, Takahiro, "Thorough Comparison, E-mail Software Best-of-ten Competition," Windows 2000 World, vol. 8, No. 2, pp. 199-211, IDG Japan, Inc., Japan, Feb. 1, 2003.

Hiraki, A. Itaru, "Integrated Sofware for Mobile Computing: MOBILESIUTE," Fujitsu, vol. 50, No. 5, pp. 334-337, Fujitsu Limited, Japan, Sep. 10, 1999.

Esposito, D., "More Windows 2000 UI Goodies: Extending Explorer Views by Customizing Hypertext Template Files", MSDN Magazine, Jun. 2000.

Office Action from the United States Patent Office regarding U.S. Appl. No. 12/639,406 dated Jan. 11, 2011.

Office Action from the Japan Patent Office regarding Japanese Patent Application No. 2005-275755 dated Apr. 8, 2011, 2 pages.

Kengo Inoue, "Supporting the start of new life, third, email/basic of BASIC," JUST MOAI, No. 132, p. 21, JustSystems Corporation, Japan, May 15, 2000, 7 pages.

Munechika Nishida, "Speedy mail software whose cooperation with the mobile phone or WorkPad is attractive, Shuriken Pro JustSystems," ASAHI Personal Computer, No. 264, pp. 100 and 101, The Asahi Shimbun Company, Japan, Apr. 15, 2000, 4 pages.

Office Action from the United States Patent Office regarding U.S. Appl. No. 10/954,328 dated Jan. 7, 2010.

Office Action from the United States Patent Office regarding U.S. Appl. No. 10/954,328 dated Dec. 23, 2008.

Office Action from the United States Patent Office regarding U.S. Appl. No. 10/954,328 dated May 22, 2008.

Office Action from the Mexican Patent Office regarding Application No. PA/a/2005/007080 dated May 29, 2008.

Office Action from the Patent Office of the Russian Federation regarding Application No. 2005120370 dated Jul. 10, 2009.

Office Action from the Patent Office of the Russian Federation regarding Application No. 2005130357 dated Aug. 6, 2009.

Office Action from the Patent Office of the Russian Federation regarding Application No. 2005120362 dated Jul. 7, 2009.

Office Action from the Japan Patent Office regarding Japanese Patent Application No. 2005-0183574 dated Jan. 14, 2011.

Office Action from the United States Patent Office regarding U.S. Appl. No. 11/993,950 dated May 1, 2008.

Office Action from the United States Patent Office regarding U.S. Appl. No. 11/993,950 dated Dec. 23, 2008.

Office Action from the United States Patent Office regarding U.S. Appl. No. 11/993,950 dated Aug. 8, 2007.

Office Action from the Korean Patent Office regarding Korean Patent Application No. 2005-0056790 dated Jul. 14, 2011, 4 pages.

Office Action from the European Patent Office regarding Application No. 05105348.6 dated Apr. 25, 2008.

Office Action from the Patent Office of the State Intellectual Property Office of the People's Republic of China regarding Application No. 200510089509.9 dated May 9, 2008.

Office Action from the Australian Patent Office regarding Application No. 2005202723 dated Aug. 11, 2010.

Office Action from the Patent Office of the State Intellectual Property Office of the People's Republic of China regarding Application No. 200510099654.5 dated Feb. 12, 2010.

Office Action from the Patent Office of the State Intellectual Property Office of the People's Republic of China regarding Application No. 200510099654.5 dated Jul. 29, 2010.

Office Action from the Australian Patent Office regarding Application No. 2005203710 dated Aug. 12, 2009.

Office Action from the Australian Patent Office regarding Application No. 2005203710 dated Dec. 18, 2009.

Office Action from the European Patent Office regarding Application No. 05105464.1 dated Apr. 12, 2007.

Office Action from the Patent Office of the State Intellectual Property Office of the People's Republic of China regarding Application No. 200510088513.3 dated May 9, 2008.

Office Action from the Australian Patent Office regarding Application No. 2005202716 dated Aug. 12, 2009.

Office Action from the Australian Patent Office regarding Application No. 2005202716 dated Dec. 18, 2009.

European Patent Office Communication regarding Application No. 05 105 348.6 dated Jan. 5, 2010, 37 pages.

Office Action from the Japan Patent Office regarding Japanese Patent Application No. 2005-275755 dated Jan. 10, 2012.

Office Action from the Japan Patent Office regarding Japanese Patent Application No. 2005-0183574 dated Dec. 2, 2011.

* cited by examiner

PROVIDING A DOCUMENT PREVIEW

BACKGROUND

When using a computer system having a modern graphical operating system, it is often desirable to view a preview of a document. A document preview is a rendering of a document that mirrors what the user will see when the document is opened with an application program associated with the document. A document preview, however, is generated and displayed without actually opening the document for editing.

Some application programs allow a user to view a static thumbnail image of a document. However, such static images are not generated dynamically, and are therefore not a true document preview that a user can page through or navigate. Other programs require a user to launch an application program associated with the document to view its contents. For instance, within an electronic mail ("e-mail") client application program, it is sometimes desirable to view a preview of one or more documents attached to an e-mail message. Current e-mail application programs, however, require a user to launch the application associated with the attached document to view the document. This process can be time consuming and frustrating for a user.

In addition to being able to view a document preview from within an application program, it also may be desirable to view a document preview from within the context of an operating system program, such as a graphical desktop shell. For instance, when a user utilizes the shell to navigate to a folder containing documents, it may be desirable for the user to quickly view a preview of the documents without the need to launch an associated application program. Similarly, it may be desirable to quickly view a document preview in the context of a dialog box utilized for opening files. In this manner, a user could view a document preview and quickly examine the contents of the document without the need to open an application program associated with the document. However, in order to preview documents utilizing current systems, each application program and operating system must implement their own framework and code for previewing documents.

It is with respect to these considerations and others that aspects of a computing system for generating document previews are described below.

SUMMARY

A system, apparatus, method, and computer-readable media are provided for generating a document preview. According to one aspect of a method provided herein, a preview handler is provided that exposes interfaces that may be called by a host application to generate a document preview without launching the application program that created the document. The interfaces exposed by the preview handler provide a common framework that may be utilized by both operating system and application program hosts to provide document previews. In this manner, document previews can be conveniently and quickly generated from within the operating system desktop shell and application programs.

According to one method described herein, a preview handler is provided that is callable by a host program. The host program may be either an operating system program or an application program. The preview handler exposes a "preview handler" interface that includes a "do preview" method which, when called by a host program, will cause the preview handler to generate and display a document preview. The preview handler may be executed out-of-process from the host application to ensure that a program execution error within the preview handler does not effect the operation of the host. The preview handler may also be executed with a higher level of security than the host program to avoid malicious exploitation of the preview handler program code.

According to other aspects, the preview handler may also be operative to expose initialization interfaces that may be called by the host program to instruct the preview handler to initialize itself on a file, item, or stream. The specified file, item, or stream may be utilized by the preview handler to generate the document preview when the do preview method is called by the host application. As used herein, the term document refers to any type of file, item, or stream for which an audio or visual preview may be generated.

According to other aspects, the preview handler interface may also include a "set window" method that may be called by the host to identify a parent window in which a previewer window containing the document preview should be generated by the preview handler. The "set window" method is also utilized to set the area within the parent window that the preview handler should size its previewer window to. The preview handler interface may also include an explicit "set rectangle" method for specifying to the preview handler a rectangle within the parent window in which the document should be displayed. The preview handler interface may also include an "unload" method which, when called, will cause the preview handler to cease rendering the document preview, a "set focus" method which, when called by the host program will cause the preview handler to set focus to itself, and a "query focus" method which, when called by the host program will cause the preview handler to return data indicating whether it has focus. Focus refers to the component of a graphical user interface that is currently selected. Text entered at the keyboard or pasted from a clipboard is sent to the component which currently has the focus.

According to other aspects described herein, the preview handler may also expose a "preview handler visuals" interface. The preview handler visuals interface includes a "set background color" method that may be called by the host to set the background color of the previewer window. The preview handler visuals interface also exposes a "set font" and a "set text color" method for changing the font and color of text within the previewer window, respectively. The visual parameters suggested by the host through calls to these methods are hints that may be ignored by the preview handler.

According to other aspects provided herein, the preview handler may be operative to pass window messages received by the previewer window to the host. This may occur, for instance, when the previewer window has focus. In order to accomplish this, the preview hander calls the host to obtain a list of window messages that the host is interested in receiving. When a window message is received at the preview handler, the preview handler may consume the message. If the preview handler does not consume the message, a determination is made as to whether the received message is identified in the list provided by the host. If so, the preview handler calls an interface on the host to pass the window message to the host. In this manner, window messages generated by key presses that should be consumed by the host application may be quickly passed to the host by the preview handler.

The above-described subject matter may also be implemented as a computer-controlled apparatus, a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

The following detailed description is directed to systems, methods, and computer-readable media for providing a document preview. While the subject matter described herein is presented in the general context of program modules that execute in conjunction with the execution of an operating system on a computer system, those skilled in the art will recognize that other implementations may be performed in combination with other program modules.

Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like. The subject matter described herein is also described as being practiced in a distributed computing environment where tasks are performed by remote processing devices that are linked through a communications network and wherein program modules may be located in both local and remote memory storage devices. It should be appreciated, however, that the implementations described herein may also be utilized in conjunction with stand-alone computer systems and other types of computing devices.

In the following detailed description, references are made to the accompanying drawings that form a part hereof, and which are shown by way of illustration specific embodiments or examples. Referring now to the drawings, in which like numerals represent like elements through the several figures, aspects of a computer system for providing a document preview will be described. In particular, FIG. 1 shows aspects of an illustrative operative environment for the subject matter described herein.

Figure 1:
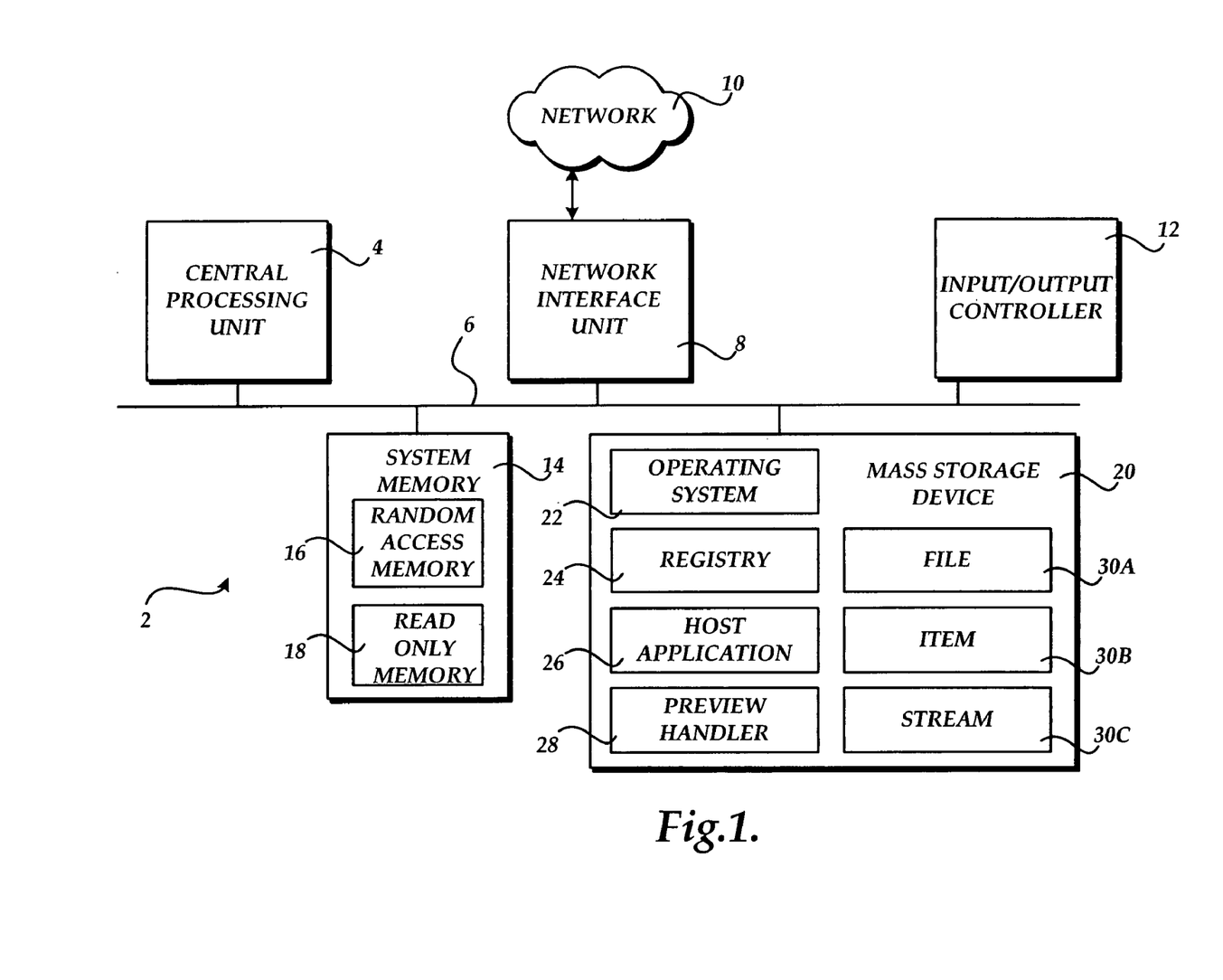
FIG. 1 is a computer architecture diagram showing a computer architecture suitable for executing program code for providing a document preview as described herein.

Referring now to FIG. 1, an illustrative computer architecture for a computer 2 utilized in the various embodiments presented herein will be discussed. The computer architecture shown in FIG. 1 illustrates a conventional desktop or laptop computer, including a central processing unit 4 ("CPU"), a system memory 14, including a random access memory 16 ("RAM") and a read-only memory ("ROM") 18, and a system bus 6 that couples the memory to the CPU 4. A basic input/output system containing the basic routines that help to transfer information between elements within the computer, such as during startup, is stored in the ROM 18. The computer 2 further includes a mass storage device 20 for storing an operating system 22 application programs, and other program modules, which will be described in greater detail below.

The mass storage device 20 is connected to the CPU 4 through a mass storage controller (not shown) connected to the bus 6. The mass storage device 20 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 2.

According to various embodiments, the computer 2 may operate in a networked environment using logical connections to remote computers through a network 10, such as the Internet. The computer 2 may connect to the network 10 through a network interface unit 8 connected to the bus 6. It should be appreciated that the network interface unit 8 may also be utilized to connect to other types of networks and remote computer systems. The computer 2 may also include an input/output controller 12 for receiving and processing input from a number of other devices, including a keyboard, mouse, or electronic stylus (not shown in FIG. 1). Similarly, an input/output controller may provide output to a display screen, a printer, or other type of output device (also not shown in FIG. 1).

As mentioned briefly above, a number of program modules and data files may be stored in the mass storage device 20 and RAM 16 of the computer 2, including an operating system 22 suitable for controlling the operation of a networked personal computer, such as the WINDOWS XP operating system from MICROSOFT CORPORATION of Redmond, Wash. The mass storage device 20 and RAM 16 may also store one or more program modules. In particular, the mass storage device 20 and the RAM 9 may store a host application 26. The host application 26 comprises any type of program that desires to provide a preview of a document to a user. For instance, the host application 26 may comprise an e-mail client application, a word processor application program, a spreadsheet application program, a presentation application program, the operating system 22, or any other type of program. These programs may utilize the facilities described herein for providing a document preview.

The mass storage device 14 and the RAM 9 are also operative to store a preview handler program 28. The preview handler 28 comprises a program that is operative to generate and display a preview of a document. As will be described in greater detail below, the preview handler 28 exposes and implements several interfaces that the host application 26 may call to generate a document preview. Provision of the document preview is abstracted from the host application 26 by the interfaces provided by the preview handler 28.

According to various implementations, the previewer handler 28 may register with the operation system 22 as a previewer for a particular type of document. Information regarding the registered previewer handlers may be maintained by the operating system 22 regarding the identity and location of the registered previewer handlers. The operating system 22 may store this information in a registry 24. It should be appreciated that the host application 26 may itself be registered as a previewer for various types of documents.

In one embodiment, an application program may register itself with the operating system 22 as the default application for opening a particular file type. The application program may also register itself as the handler for other types of verbs. For instance, the application program may also register itself as the default application for generating previews for a particular document type. Alternatively, a preview handler 28 may also register itself as the default application for generating previews for a particular document type.

In some cases, conflicts can arise whereby multiple programs or preview handlers attempt to register themselves as the provider of document previews for a particular file type. In order to resolve such conflicts, the application program that is registered to open files of the particular file type is also utilized as the preview handler for the document. Utilizing the default application as the preview handler guarantees that the document preview is visually consistent with the display of the document when it is opened for editing. It should be appreciated that a facility may be provided by the operating system 22 that allows a user to modify the default application and the preview handler for a particular file type.

According to other embodiments, the preview handler 28 is executed out-of-process from the host 26. This ensures that a program error in the preview handler 28 will not effect the operation of the host 26. Additionally, the preview handler 28 may also be executed in a manner that provides heightened security. In particular, the preview handler 28 may be executed with a higher level of security than the host 26. For instance, in one embodiment, the preview handler 28 is executed with "low integrity" whereby the preview handler 28 can only write to limited locations on the mass storage device 20 and only communicate with other low integrity processes. This assists in preventing the misuse of a preview handler 28, for instance, through the exploitation of a buffer overrun.

As discussed briefly above, the preview handler 28 is operative to generate a preview of a document. As used herein, the term document refers to any type of file, item, or stream for which an audio or visual preview may be generated. Accordingly, the preview handler 28 may be utilized to generate a preview of a file 30A stored on the mass storage device 20 or another local or remote file system, an item 30B, or a data stream 30C. Additional details regarding the operation of the host application 26 and the preview handler 28 will be provided below with respect to FIGS. 2-5.

Figure 2:
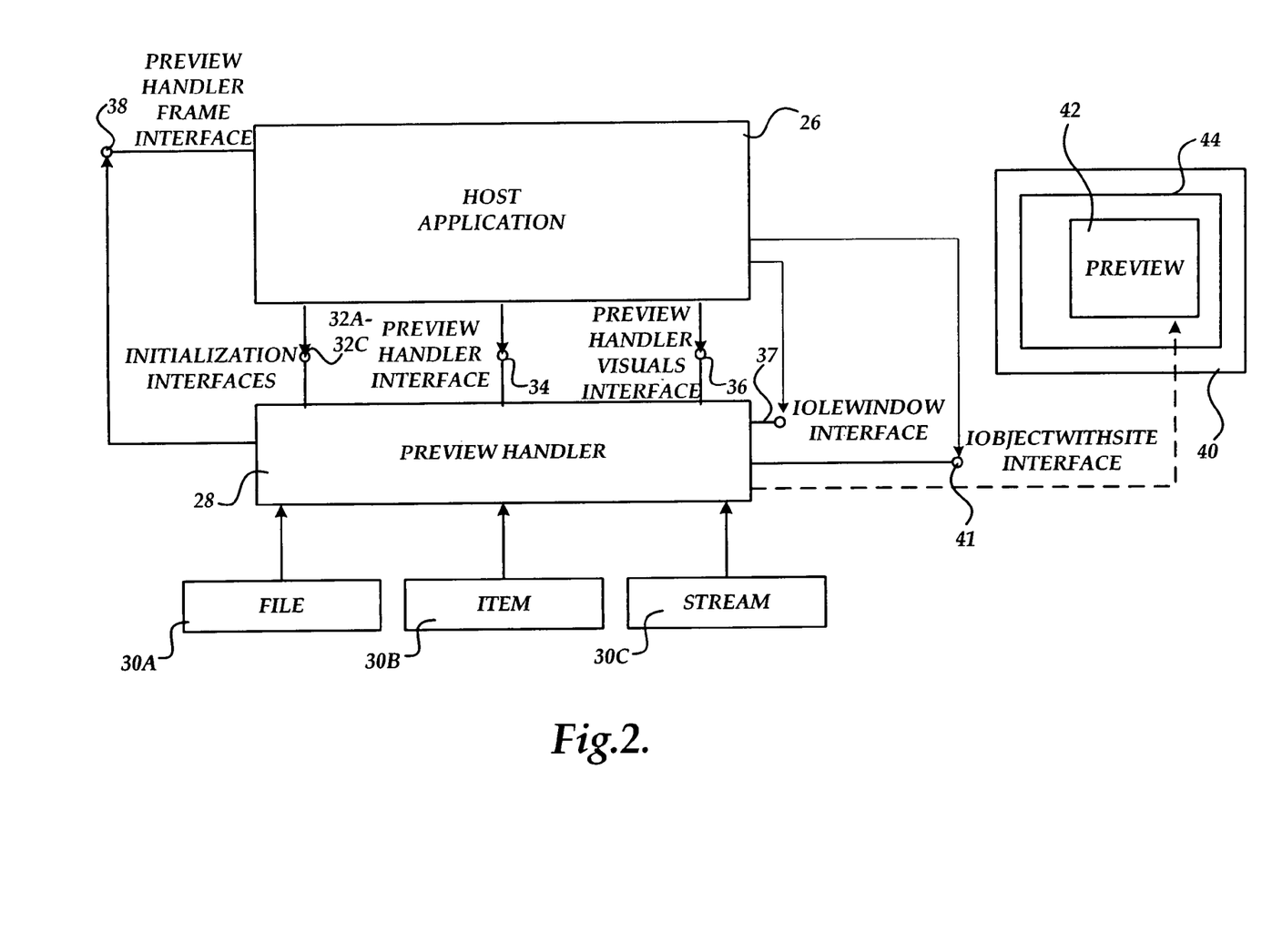
FIG. 2 is a software architecture diagram illustrating aspects of a software architecture for generating a document preview described herein.

Referring now to FIG. 2, additional details will be provided regarding the various software components provided by the embodiments discussed herein. As shown in FIG. 2, the host application 26 communicates with the preview handler 28 through several interfaces exposed by the preview handler 28. In particular, the preview handler 28 exposes three initialization interfaces 32A-32C, a preview handler interface 34, a preview handler visuals interface 36, an IOleWindow interface 37, and an IObjectWithSite Interface 41. The host application 26 also exposes a preview handler frame interface 38 for communicating with the preview handler 28. Additional details regarding the use and operation of each of these interfaces are provided below with respect to FIG. 3.

As will be discussed in greater detail below, in order to generate a document preview, the host application 26 initializes the preview handler 28 on a file 30A, an item 30B, or a stream 30C. The host application 26 also passes a handle to a window 40 to the preview handler 28. In order to render the preview 42 within the window 40, the preview handler 28 creates a sub-window 44, or previewer window, within the window 40. Because user input directed to the previewer window 42 will be received by the preview handler 28, the preview handler 28 is operative to process certain types of input and to pass other types of input to the host application 26. In this manner, input received by the preview handler 28 that is actually intended for the host application 26 may be processed by the host application 26. Additional details regarding this process are also provided below.

Figures 3A, 3B, 3C, 3D, 3E, 3F:
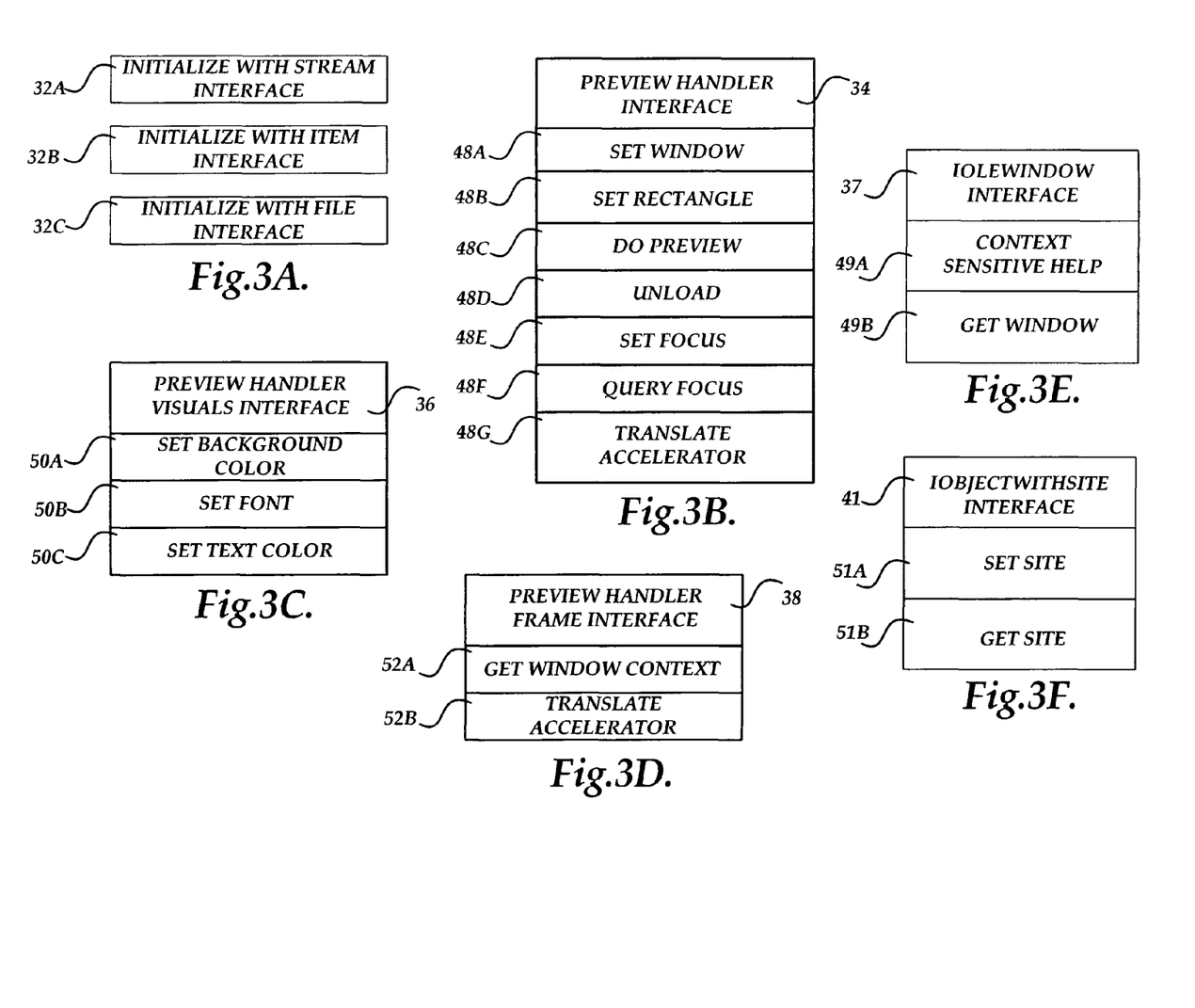
FIGS. 3A-3F are software interface diagrams illustrating aspects of various interfaces described herein.

Referring now to FIG. 3A, additional details regarding the initialization interfaces 32A-32C provided by the preview handler 28 will be provided. In general, the initialization interfaces 32A-32C provides a mechanism by which the host application 26 can specify the document to be rendered by the preview handler 28. In particular, the initialization interface 32A exposes a single method for initializing the preview handler on a stream 30C. The initialization interface 32B exposes a single method for initializing the preview handler on an item 30B. The initialization interface 32C exposes a single method for initializing the preview handler on a file 30A. The preview handler 28 should not read in all of the data from the file 30A, item 30B, or stream 30C before returning. All of the data from the file 30A, item 30B, or stream 30C is read in and utilized to render the preview when the do preview method 48C is called, as discussed below. It should be appreciated that these methods may be called multiple times, separated by calls to the unload method 48D described below, as different documents are selected without destroying the preview handler 28.

FIG. 3B illustrates aspects of the preview handler interface 34 provided by the preview handler 28. In particular, the preview handler interface 34 provides a set window method 48A. The set window method 48A is utilized by the host application 26 to set the parent window 40 that the preview handler 28 should utilize to parent its previewer window 44. The set window method 48A is also utilized to set the area within the parent window 30 that the preview handler 28 should size its previewer window 44 to. The preview handler 28 is responsible for painting the entire area. If the previewer window 44 has not yet been created, the preview handler 28 must remember this information for when the previewer window 44 is created. If the previewer window 44 has been created, the preview handler 28 must reparent the previewer window 44 to the new parent window 40 and resize the previewer window 44 to the size specified. The set window method 48A should only be called once prior to calling the do preview method 48C, described below.

The preview handler interface 34 also exposes a set rectangle method 48B. This method directs the preview handler 28 to change the area within the parent window 40 that it draws into. This method should only be called after the set window method 38A, described above, has been called. The preview handler interface 34 also provides a do preview method 48C. The do preview method 48C directs the preview handler 28 to begin rendering the document preview 42 to the previewer window 44. If the previewer window 44 has not yet been created, then it must be created when this method is called. The preview handler 28 is responsible for painting the area specified utilizing the set window method 48A or the set rectangle method 48B. This method is only called after the set window method 48A has been called.

The preview handler interface 34 also exposes an unload method 48D. This method directs the preview handler 28 to cease rendering a preview and to release all resources that have been allocated based on the file, item, or stream passed in during initialization. The previewer window 44 is destroyed, but the preview handler 28 maintains information identifying the parent window 40 and the rectangle within the parent window 40 that the preview 42 should be rendered in.

The preview handler interface 34 also exposes a set focus method 48E and a query focus method 48F. The set focus method 48E directs the preview handler 28 to set focus to itself. As described briefly above, focus refers to the component of a graphical user interface that is currently selected. Text entered at the keyboard or pasted from a clipboard is sent to the component which currently has the focus. A call to the query focus method 48F causes the preview handler 28 to return data indicating whether it currently has focus. Additional details regarding the translate accelerator method 48G provided by the preview handler interface 34 are discussed below with reference to FIGS. 3D and 5.

FIG. 3C illustrates aspects of the preview handler visuals interface 36 provided by the preview handler 28. The preview handler 28 may be programmed in a manner such that it does not draw the entire region of the window 40 and draws black or white in the remainder of the region. In this case, it is desirable for the host application 26 to provide the preview handler 28 with hints about how to draw the remainder of the background. In particular, a set background color method 50A is exposed through which the host 26 can specify a background color for the preview handler to use. A set font method 50B is also exposed through which the host 26 can instruct the preview handler 28 which font to use. A set text color method 50C is also exposed through which the host 26 can instruct the preview handler 28 which text color to use. Values provided through calls to these methods are stored by the preview handler 28 for use when the preview 42 is actually drawn. As discussed above, these values are merely hints provided by the host 26 and may therefore be ignored by the preview handler 28. The preview handler visuals interface 36 is an optional interface for the preview handler 28.

FIG. 3D illustrates aspects of the preview handler frame interface 38. This interface is provided by the host application 26. As discussed above, it is frequently desirable for the preview handler 28 to pass window messages to the host 26 for processing. In order to accomplish this, the translate accelerator method 48G on the preview handler interface 34 is utilized in conjunction with the preview handler frame interface 38 on the host 26. The preview handler frame interface 38 includes a get window context method 52A and a translate accelerator method 52B.

When the preview handler 28 is created, it calls the get window context method 52A on the host 26. In return, the host 26 provides to the preview handler 28 a list of list of window messages that it is interested in receiving. In this manner, the host 26 identifies to the preview handler 28 the keystrokes it desires to be forwarded. The preview handler 28 saves the list. The translate accelerator method 48G on the preview handler interface 34 is called by the message pump of the preview handler process when a window message is received. When this occurs, the translate accelerator method 48G determines if the keystroke should be consumed by the preview handler. If so, the message is consumed. If not, a determination is made as to whether the received message is in the list provided by the host 26. If so, the translate accelerator method 52B is called on the preview handler frame interface 38 on the host, where it is consumed. In this manner, the window message is passed from the preview handler 28 to the host 26. Additional details regarding this process are provided below with respect to FIG. 5. The preview handler frame interface 38 may also expose an IServiceProvider method to assist with determining the particular host 26 that has loaded a particular previewer.

FIG. 3E illustrates aspects of the IOleWindow interface 37. The IOleWindow interface 37 includes a context sensitive help method 49A and a get window method 49B. The get window method can be utilized to obtain a reference to the previewer window 44. This may be utilized by the host 26, for instance, to create a snapshot of the previewer window 44 for use in visual transitions. The IOleWindow interface 37 is an optional interface.

FIG. 3F illustrates aspects of the IObjectWithSite interface 41. The IObjectWithSite interface 41 exposes a set site method 51A and a get site method 51B. The IObjectWithSite interface 41 is utilized to provide the Preview Handler Frame interface 38 to the preview handler. When a preview handler is initialized, the host 26 calls the set site method 51A, which causes the preview handler to query the site point passed in to get the Preview Handler Frame interface 38.

Figure 4:
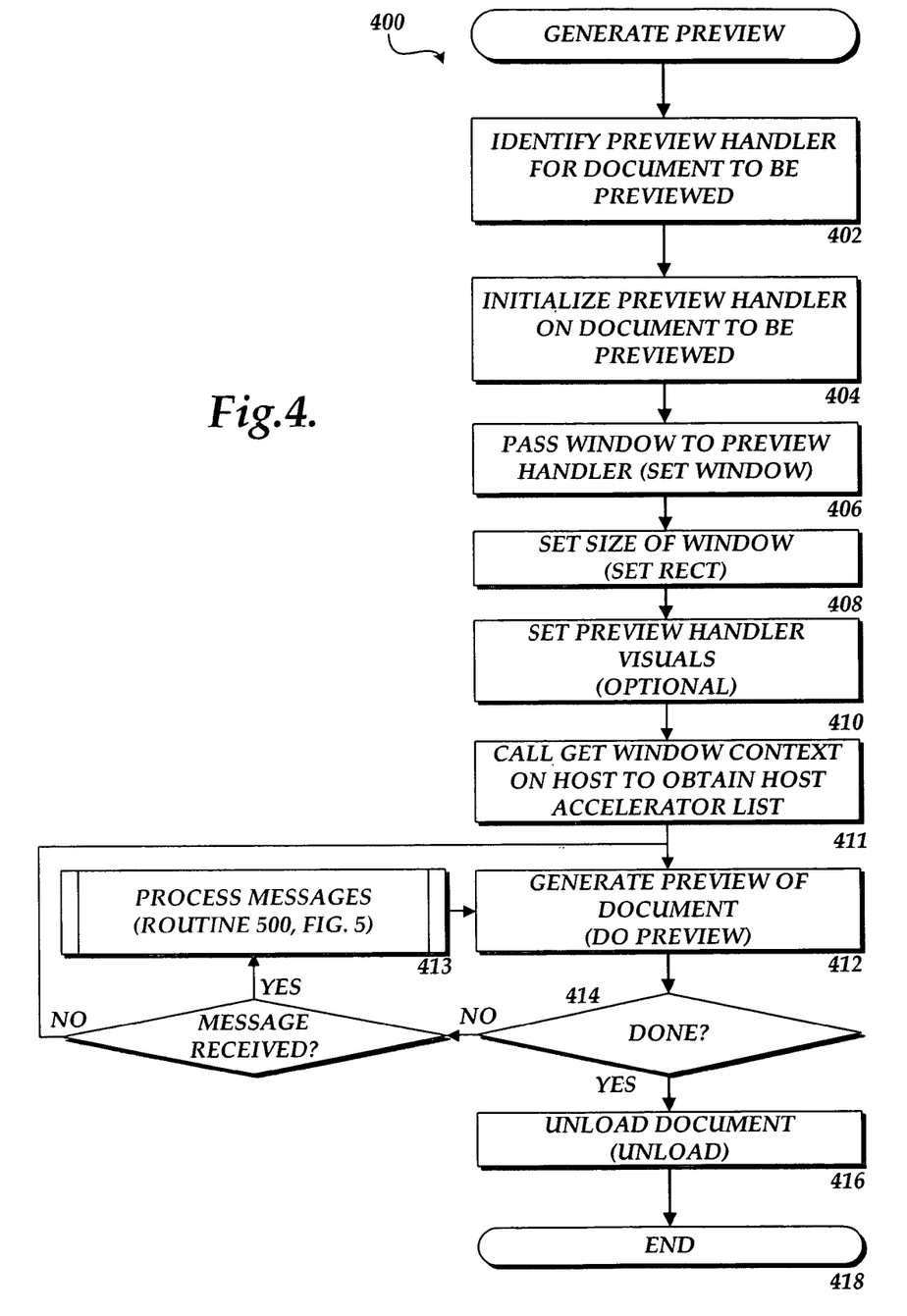
FIGS. 4-5 are flow diagrams showing several processes for generating a document preview as provided herein.

Turning now to FIG. 4, an illustrative routine 400 will be described showing the operation of the computer 2 for providing a document preview. It should be appreciated that the logical operations described herein are implemented (I) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination.

The routine 400 begins at processing operation 402, where the particular preview handler 28 to be utilized to preview a document is identified. As discussed above with respect to FIG. 1, the program that is registered as the default application for the particular document type may be identified in the registry 24 as the proper preview handler for the document. Once the proper preview handler 28 has been identified, the routine 400 continues from operation 402 to operation 404.

At operation 404, the preview handler 28 is initialized on the document to be previewed through a call to the appropriate initialization interface 32A-32C. The method of the interface 32A is called if the document is a stream, the method of the interface 32B is called if the document is an item, and the method of the interface 32C is called if the document is a file. Once the preview handler 28 has been initialized, the routine 400 continues to operation 406. At operation 406, the host 26 passes a handle to the parent window 40 to the preview handler 28 through a call to the set window method 48A on the preview handler interface 34. At operation 408, the set rectangle method 48B is also called to specify the area in the parent window 40 in which the preview handler 28 should render. It should be appreciated that although FIG. 4 illustrates a call to the set rectangle method 48B occurring immediately after a call to the set window method 48A, it is unlikely that such a call would occur in this manner. This is because although a call to the set rectangle method 48B may occur at any time after the set window method 48A is called, the set window method 48A includes an implicit set rectangle function. Therefore, it is more likely that a call to the set rectangle method 48B would occur at a later time. It should also be appreciated that any number of additional calls to the set rectangle method 48B may be made to change the area in which the preview handler 28 is rendering.

From operation 408, the routine 400 continues to operation 410, where the host 26 optionally provides hints on how to display the background and text within the previewer window 44 through calls to the methods of the preview handler visuals interface 36. From operation 410, the routine 400 continues to operation 411, where where the preview handler 28 calls the get window context method 52A on the host 26 to obtain the list of window messages that the host 26 is interested in obtaining. This list is stored by the preview handler 28.

From operation 411, the routine 400 continues to operation 412, where the host application 26 calls the do preview method 48C on the preview handler interface 34. As described above, a call to the do preview method 48C causes the preview handler 28 to generate the preview 42. The routine 400 then continues to operation 414, where a determination is made as to whether the user has finished viewing the preview. If so, the routine 400 continues to operation 416, where the unload method 48D on the preview handler interface 34 is called to discontinue the preview 42 and unload the resources utilized by the preview handler 28. The preview handler 28 may then be initialized on another document. From operation 416, the routine 400 continues to operation 418, where it ends.

Figure 5:
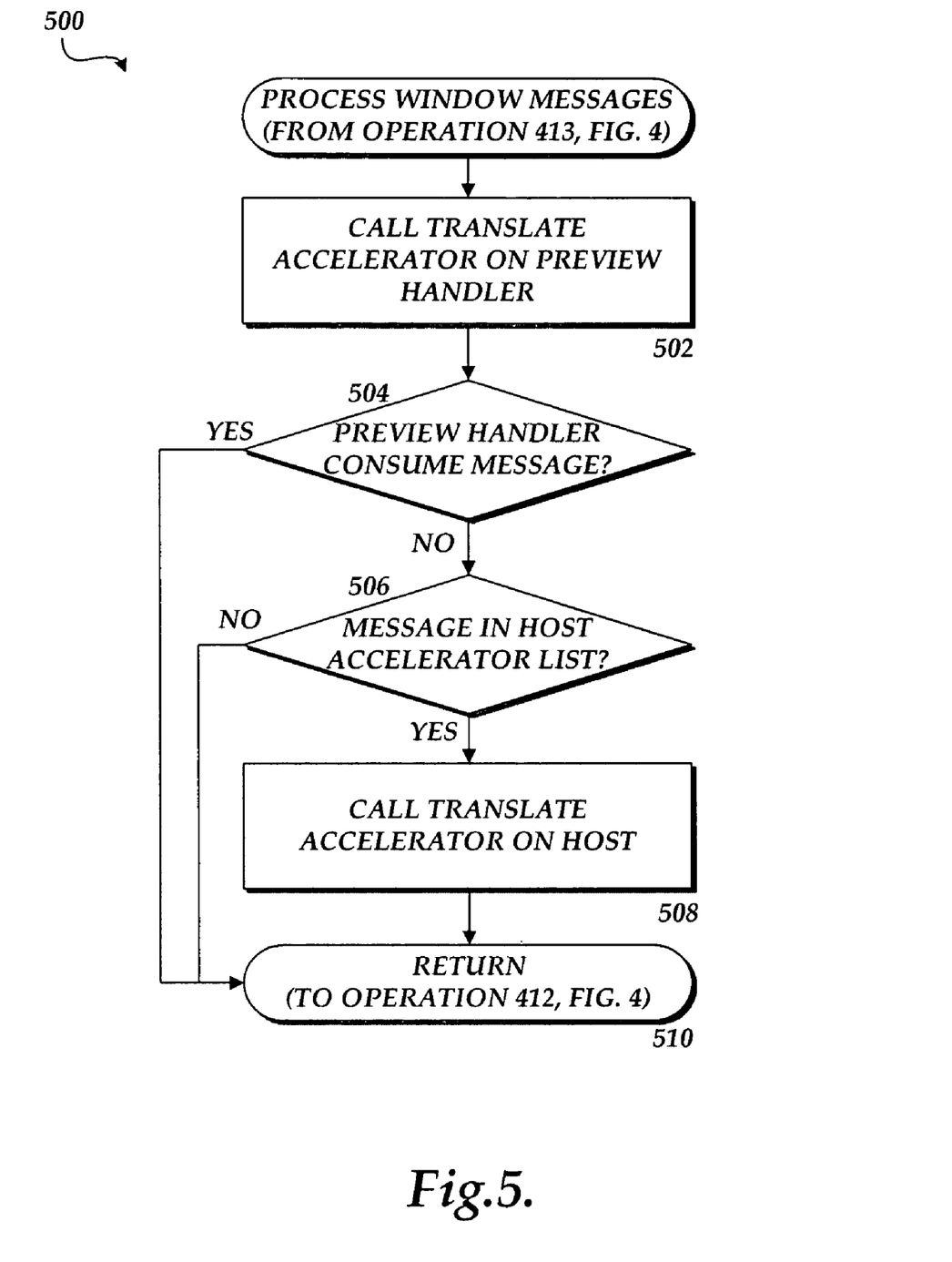

If, at operation 414, it is determined that the user is not done viewing the preview, the routine 400 branches to operation 414. At operation 414 a determination is made as to whether a window message has been received at the preview handler 28. If so, the routine 400 branches to operation 403, where the received message is processed. FIG. 5, described below, illustrates a routine for processing messages. Once processing of the message has completed, the routine 400 continues to operation 412, where the preview is continually generated.

Turning now to FIG. 5, an illustrative routine 500 will be described for passing window messages received by the preview handler 28 to the host 26. The routine 500 begins at operation 502, where the message pump in the preview handler process calls the translate accelerator method 48G on the preview handler 28. The routine 500 then continues from operation 502 to operation 504, where a determination is made as to whether the preview handler 28 will consume the message. If so, the routine 500 branches from operation 504 to operation 510, where it returns. If not, the routine 500 continues from operation 504 to operation 506.

At operation 506, a determination is made as to whether the received message is identified in the list provided by the host 26. If not, the routine 500 branches from operation 506 to operation 510, where it returns. If so, the routine 500 continues from operation 506 to operation 510. At operation 510, the translate accelerator method 52B is called on the host 26 with the received message. In this manner, only the window messages that the host 26 is interested in processing are forwarded to the host. The routine 500 then continues from operation 508 to operation 510, where it returns to operation 412, described above with respect to FIG. 4.

Based on the foregoing, it should be appreciated that systems, methods, and computer-readable media for providing a document preview are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims. The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for providing a document preview, the method comprising:

providing a preview handler on a computer for generating a document preview, the preview handler exposing a plurality of interfaces that provide a common framework capable of being utilized by an operating system and a plurality of application programs including an electronic mail client application program, a word processor application program, and a spreadsheet application program, wherein:

the preview handler is callable by a host program running on the computer for generating a document preview of a file of a particular file type, the host program comprises the electronic mail client application program and calls the preview handler for generating a document preview of a file of the particular file type attached to an electronic mail message, the preview handler comprises a different application program of the plurality of application programs that is registered with the operating system for opening files of the particular file type, the preview handler is executed out-of-process from the host program and operative to expose a preview handler interface, the preview handler interface comprises a preview method which, when called by the host program, will cause the preview handler to generate the document preview within a previewer window;

the preview handler calling an interface on the host program and, in response, receiving from the host program a list identifying user input to be processed by the host program if received by the preview handler; and the preview handler receiving user input directed to the previewer window when the document preview is displayed and the preview handler has focus, the preview handler operative to process certain types of user input and to pass user input identified in the list to the host program for processing.

2. The method of claim 1, wherein the preview handler interface further comprises a set window method that may be called by the host program to identify a parent window in which the previewer window containing the document preview should be generated by the preview handler.

3. The method of claim 2, wherein the preview handler interface further comprises a set rectangle method that may be called by the host program to specify a rectangle within the parent window in which the document preview should be displayed.

4. The method of claim 3, wherein the preview handler interface further comprises an unload method which, when called by the host program, will cause the preview handler to cease rending the document preview.

5. The method of claim 4, wherein the preview handler interface further comprises a set focus method which, when called by the host program, will cause the preview handler to set focus to itself.

6. The method of claim 5, wherein the preview handler interface further comprises a query focus method which, when called by the host program, will cause the preview handler to return data indicating whether it has focus.

7. The method of claim 6, wherein the preview handler is further operative to expose an initialize interface, the initialize interface comprising a method for receiving the identity of a file that should be utilized by the preview handler to generate the document preview.

8. The method of claim 6, wherein the preview handler is further operative to expose an initialize interface, the initialize interface comprising a method for receiving the identity of an item that should be utilized by the preview handler to generate the document preview.

9. The method of claim 6, wherein the preview handler is further operative to expose an initialize interface, the initialize interface comprising a method for receiving the identity of a stream that should be utilized by the preview handler to generate the document preview.

10. The method of claim 6, wherein the preview handler is executed with a higher level of security than the host program.

11. The method of claim 6, wherein the preview handler is further operative to expose a preview handler visuals interface, the preview handler visuals interface comprising a set background color method for changing a background color of the previewer window.

12. The method of claim 11, wherein the preview handler visuals interface further comprises a set font method for changing a font of text within the previewer window.

13. The method of claim 12, wherein the preview handler visuals interface further comprises a set text color method for changing the color of text within the previewer window.

14. A method for providing a document preview, the method comprising:
providing a preview handler on a computer for generating a document preview, the preview handler exposing a plurality of interfaces that provide a common framework capable of being utilized by an operating system and a plurality of application programs including an electronic mail client application program, a word processor application program, and a spreadsheet application program, wherein:
the preview handler is callable by a host program running on the computer for generating a document preview of a file of a particular file type,
the host program comprises the electronic mail client application program and calls the preview handler for generating a document preview of a file of the particular file type attached to an electronic mail message,
the preview handler comprises a different application program of the plurality of application programs that is registered with the operating system for opening files of the particular file type,
the preview handler is operative to expose a preview handler interface to the host program,
the preview handler interface comprises a preview method which, when called by the host program, will cause the preview handler to generate the document preview within a previewer window;
calling an interface on the host program and, in response, receiving from the host program a list of window messages identifying user input to be processed by the host program if received by the preview handler;
receiving a window message at the preview handler, the window message comprising user input directed to the previewer window when the document preview is displayed and the preview handler has focus;
determining if the window message comprises user input identified in the list and should be provided to the host program; and
in response to determining that the window message should be provided to the host program, calling the interface on the host program for passing the window message to the host program.

15. The method of claim 14, further comprising:
if the received window message comprises a keystroke identified in the list of window messages received from the host program, determining that the window message should be provided to the host program.

16. A computer-readable storage medium having computer-executable instructions stored thereon which, when executed by a computer, will cause the computer to:
provide a preview handler for generating a document preview, the preview handler exposing a plurality of interfaces that provide a common framework capable of being utilized by an operating system and a plurality of application programs including an electronic mail client application program, a word processor application program, and a spreadsheet application program, wherein:
the preview handler is callable by a host program running on the computer for generating a document preview of a file of a particular file type,
the host program comprises the electronic mail client application program and calls the preview handler for generating a document preview of a file of the particular file type attached to an electronic mail message,
the preview handler comprises a different application program of the plurality of application programs that is registered with the operating system for opening files of the particular file type,
the preview handler is operative to expose a preview handler interface comprising a set window method for identifying a parent window in which a previewer window containing the document preview should be generated by the preview handler, a set rectangle method that may be called to specify a rectangle within the parent window in which the document preview should be displayed, and a preview method which, when called by a host program, will cause the preview handler to generate and display the document preview within the previewer window;
call, from the preview handler, an interface on the host program;
receive, at the preview handler, a list from the host program identifying user input to be processed by the host program if received by the preview handler;
receive, at the preview handler, user input directed to the previewer window when the document preview is displayed and the preview handler has focus; and
process certain types of user input at the preview handler and pass user input identified in the list to the host program for processing.

17. The computer-readable storage medium of claim 16, wherein the preview handler interface further comprises a set focus method which, when called, will cause the preview handler to set focus to itself, a query focus method which, when called, will cause the preview handler to return data indicating whether it has focus, and an unload method which, when called by the host program, will cause the preview handler to cease rending the document preview.

18. The computer-readable storage medium of claim 17, wherein the preview handler is operative to expose a preview handler visuals interface comprising one or more methods for modifying the visual appearance of the contents of the previewer window.

19. The computer-readable storage medium of claim 18, wherein the preview handler is operative to expose one or more initialize interfaces comprising methods for receiving the identity of a file, item, or stream that should be utilized by the preview handler to generate the document preview.

20. The computer-readable storage medium of claim 19, comprising further computer executable instructions which, when executed by the computer, will cause the computer to:

receive, at the preview handler, a list of window messages identifying user input that should be forwarded to the host program;

receive a window message at the preview handler;

determine whether the window message comprises user input identified in the list; and to forward the window message to the host program in response to determining that the window message is identified in the list.

\* \* \* \* \*